United States Patent
Aiso et al.

(10) Patent No.: US 7,139,625 B2
(45) Date of Patent: Nov. 21, 2006

(54) AUDIO SIGNAL PROCESSING DEVICE

(75) Inventors: Masaru Aiso, Hamamatsu (JP); Akio Suyama, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 708 days.

(21) Appl. No.: 10/617,160

(22) Filed: Jul. 9, 2003

(65) Prior Publication Data

US 2004/0015252 A1    Jan. 22, 2004

(30) Foreign Application Priority Data

Jul. 18, 2002    (JP) .............................. 2002-209079

(51) Int. Cl.
*H04H 7/00*    (2006.01)
(52) U.S. Cl. .................. 700/94; 381/119; 715/769
(58) Field of Classification Search ................ 381/119; 715/769–770
See application file for complete search history.

(56) References Cited

U.S. PATENT DOCUMENTS

| 4,275,268 | A | * | 6/1981 | Takahashi et al. | ........... 381/119 |
| 4,479,240 | A | * | 10/1984 | McKinley, Jr. | .............. 381/119 |
| 4,879,751 | A |  | 11/1989 | Franks et al. |  |
| 4,905,185 | A | * | 2/1990 | Sakai | ......................... 715/769 |
| 5,243,513 | A |  | 9/1993 | Peters |  |
| 6,839,441 | B1 | * | 1/2005 | Powers et al. | .............. 381/119 |

* cited by examiner

*Primary Examiner*—Daniel Swerdlow
(74) *Attorney, Agent, or Firm*—Morrison & Foerster LLP

(57) ABSTRACT

An audio signal processing device which processes audio signals and outputs the audio signals, is made capable of storing a plurality of setting data as scenes, selecting a portion to be copied as copy data from current data being setting data representing a current status of the device in accordance with the setting at a copy data selection section, selecting a scene to be a paste destination of the copy data in accordance with the setting at a paste destination selection section, and rewriting with the copy data a portion corresponding to the copy data among the scene selected as the paste destination.

10 Claims, 10 Drawing Sheets

AUDIO SIGNAL PROCESSING DEVICE

BACKGROUND OF THE INVENTION

1. Field of the Invention

The present invention relates to an audio signal processing device composed of a mixer, an effecter, a recorder, a synthesizer, and combination thereof, which optionally processes inputted audio signals and outputs the audio signals.

2. Description of the Related Art

Conventionally, digital mixers for controlling audio systems at places, for example, for concerts, plays, and so on have been known as audio signal processing devices which optionally process inputted audio signals and output the audio signals. In such places, many microphones and many speakers are used to provide a variety of sound effects and so on, in which the digital mixer controls in a centralized manner how to mix many inputs, how to apply such effects, to which output system to output them, and so on. In other words, the digital mixer performs mixing, equalizing, and so on, in accordance with a setting, for audio signals of voice inputted through the microphones and outputs them to the speakers.

The setting, however, should be done over a wide range such as a mixing status, a patch status, names of switches, kinds of boards used for input and output, and so on, leading to difficult setting operation when and where required. Hence, several required settings are stored in advance as "scenes", so that a required scene is selected and loaded from among the stored ones to reproduce a required setting status at a required situation.

In such a mixer, however, since one scene includes the setting associated with the whole mixer, the load and save of the scene needs to be done in batch. Therefore, even when, for example, only the setting of one effector for an existing scene needs to be modified, it is necessary to load the whole scene, then perform the necessary modification, and save the modified whole scene again. This causes greatly reduced operability because updating a scene may often require only modification of not the whole scene but a part thereof.

Besides, in such a mixer, since contents of mixing processing, display on a screen, positions of controls, and so on are automatically modified to be suitable for the setting of the loaded scene when loading a scene, an operator needs to wait for completion of such modification every load of a scene, resulting in further reduced operability of editing.

In addition, the problem of the reduced operability is particularly serious in such a case that similar modifications are desired to be performed for a plurality of scenes because they are loaded one by one and edited in sequence.

Besides, a mixer that has a channel library function of separately storing a setting of a channel in current data which is setting data reflected in processing, also has the problem of the reduced operability because the mixer needs to load scenes one by one and work for them in sequence, although the mixer may edit the scenes in the following procedure:

(1) Set a parameter on one channel of current data by operating controls.
(2) Store in a channel library a setting of the channel.
(3) Load a scene desired to be modified.
(4) Load the setting stored in the channel library into a channel desired to be modified of the loaded scene, and rewrite the channel with the setting.
(5) Save the modified scene.

SUMMARY OF THE INVENTION

It is an object of the invention to solve the above-described problems and to improve the operability of work of editing setting data in an audio signal processing device that optionally processes inputted audio signals and outputs the audio signals.

In order to achieve the above object, the invention is an audio signal processing device which processes audio signals and outputs the audio signals, including: a first memory for storing a plurality of setting data each representing a setting status of the device; a second memory for storing current data being setting data representing a current setting status of the device; a controller for controlling the processing for the audio signals based on the current data; a copy data selector for selecting a portion to be copied among the current data as copy data; a paste destination selector for selecting setting data to be a paste destination of the copy data from the setting data stored in the first memory; and a paste executor for rewriting with the copy data a portion corresponding to the copy data among the setting data selected by the paste destination selector.

Alternatively, the invention is an audio signal processing device which processes audio signals and outputs the audio signals, including: a first memory for storing a plurality of setting data each representing a setting status of the device; a second memory for storing current data being setting data representing a current setting status of the device; a controller for controlling the processing for the audio signals based on the current data; a work memory for temporarily storing the setting data; a copy data selector for selecting a portion to be copied among the current data as copy data; a paste destination selector for selecting setting data to be a paste destination of the copy data from the setting data stored in the first memory; a loader for loading the setting data selected by the paste destination selector into the work memory; a paste executor for rewriting with the copy data a portion corresponding to the copy data among the setting data loaded by the loader; and a modified data writer for writing the setting data rewritten by the paste executor over setting data of a load source by the loader.

In such an audio signal processing device, it is preferable that when the setting data to be loaded is empty data, the loader causes the work memory to store predetermined initial data in place of the empty data.

Alternatively, the invention is an audio signal processing device which processes audio signals and outputs the audio signals, including: a first memory for storing a plurality of primary setting data each representing a setting status of the device; a second memory for storing current data being setting data representing a current setting status of the device, including the primary setting data and secondary setting data linked from the primary setting data; a third memory for storing the secondary setting data linked from each of the primary setting data; a selector for selecting primary setting data to be loaded from the primary setting data stored in the first memory; a loader for loading the primary setting data selected by the selector and secondary setting data linked from the primary setting data into the second memory, as the current data; a controller for controlling the processing for the audio signals based on the current data; a paste destination selector for selecting primary setting data to be a paste destination of the secondary setting data constituting the current data, from the primary setting data stored in the first memory; and a paste executor for rewriting with the secondary setting data constituting the current data the secondary setting data linked from the primary setting data selected by the paste destination selector.

In these audio signal processing devices, the setting status of the device is preferably a setting status of a parameter on the processing for the audio signals.

Further, the invention is a computer program containing program instructions executable by a computer and causing the computer to execute: a process of controlling processing for audio signals based on current data being setting data representing a current setting status of the computer; a process of selecting a portion to be copied among the current data as copy data; a process of selecting setting data to be a paste destination of the copy data from a plurality of setting data each representing a setting status of the computer and stored in a memory; and a process of rewriting with the copy data a portion corresponding to the copy data among the setting data selected to be the paste destination.

Alternatively, the invention is a computer program containing program instructions executable by a computer and causing the computer to execute: a process of controlling processing for audio signals based on current data being setting data representing a current setting status of the computer; a process of selecting a portion to be copied among the current data as copy data; a process of selecting setting data to be a paste destination of the copy data from a plurality of setting data each representing a setting status of the computer and stored in a memory; and a process of temporarily loading the setting data selected to be the paste destination into a work memory; a process of rewriting with the copy data a portion corresponding to the copy data among the loaded setting data; and a process of writing the rewritten setting data over a load source of the setting data.

Alternatively, the invention is a computer program containing program instructions executable by a computer and causing the computer to execute: a process of controlling processing for audio signals based on current data being setting data representing a current setting status of the computer, including primary setting data representing a setting status of the computer and secondary setting data linked from the primary setting data; a process of selecting primary setting data to be a paste destination of the secondary setting data constituting the current data, from a plurality of the primary setting data stored in a memory; and a process of rewriting with the secondary setting data constituting the current data the secondary setting data linked from the primary setting data selected to be the paste destination.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, preferred embodiments of the invention will be described with reference to the drawings.

Figure 7:
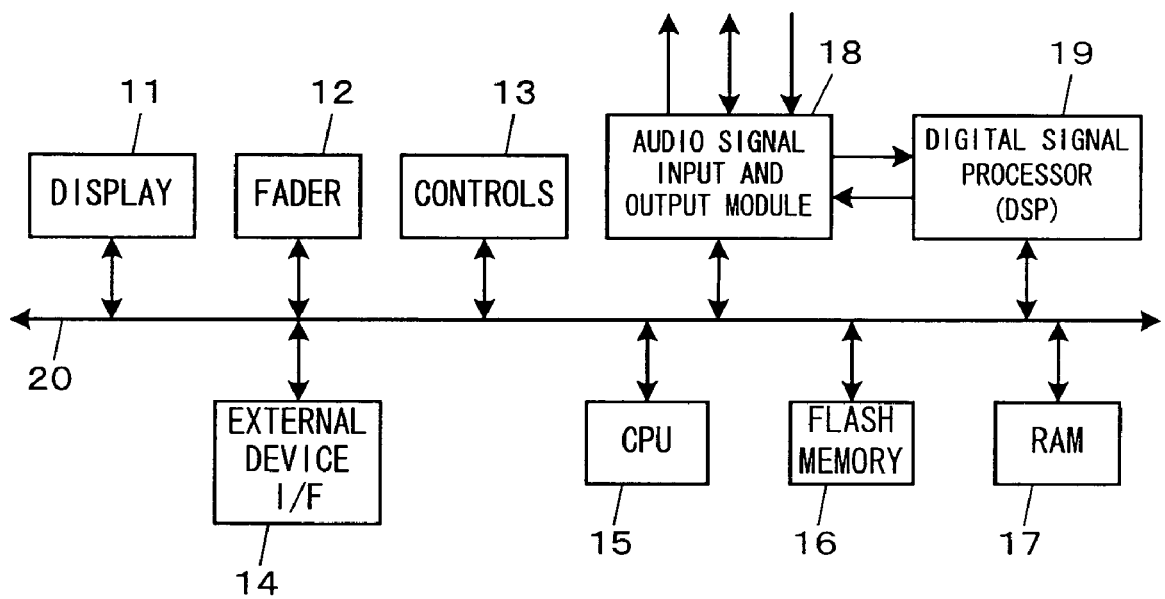
FIG. 7 is a block diagram showing a schematic configuration of the digital mixer being the embodiment of the invention.
Figure 8:
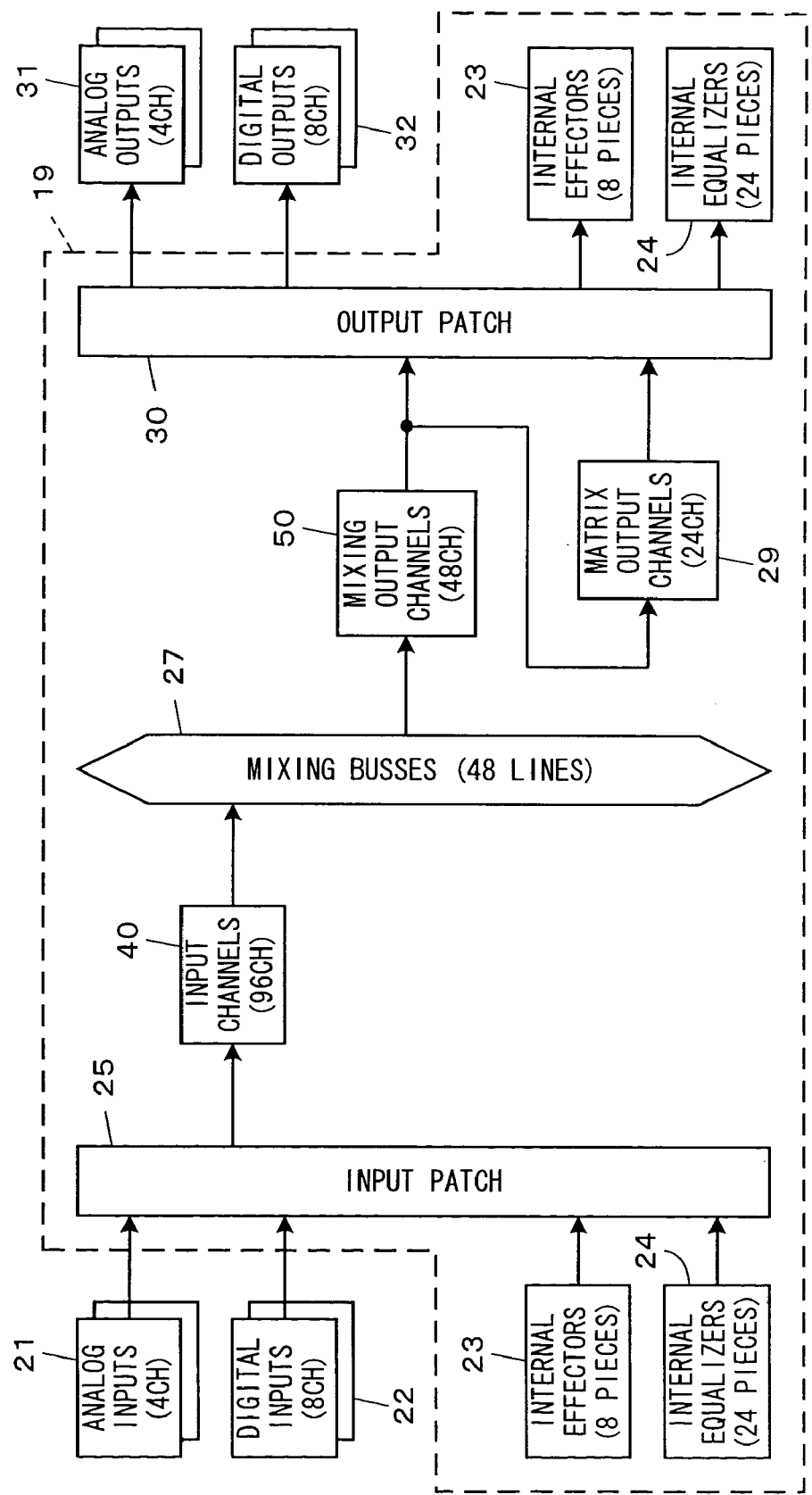
FIG. 8 is a block diagram showing in more detail the configuration of the DSP shown in FIG. 7.
Figure 9:
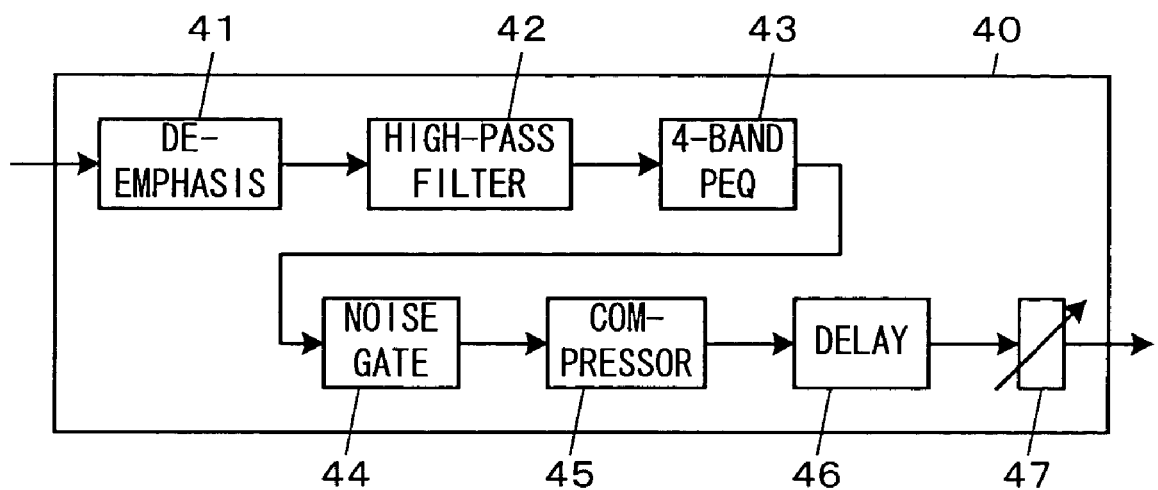
FIG. 9 is a block diagram showing a configuration of one channel constituting an input channel shown in FIG. 8.
Figure 10:
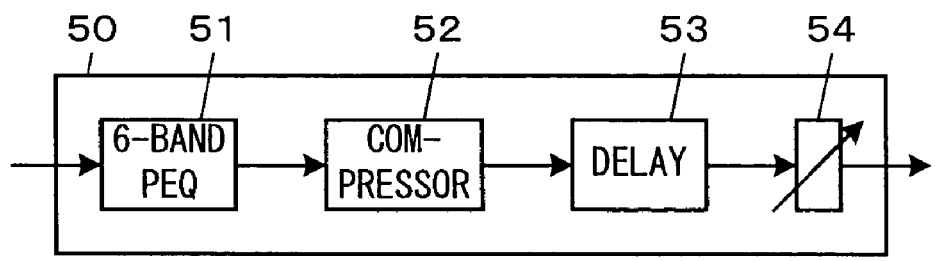
FIG. 10 is a block diagram showing a configuration of one channel constituting a mixing output channel shown in FIG. 8.

A configuration of a digital mixer being an embodiment of an audio signal processing device of the invention will be described first using FIG. 7 to FIG. 10. FIG. 7 is a block diagram showing a schematic configuration of the digital mixer, FIG. 8 is a block diagram showing in more detail the configuration of the DSP shown in FIG. 7, FIG. 9 is a block diagram showing a configuration of one channel constituting an input channel shown in FIG. 8, and FIG. 10 is a block diagram showing a configuration of one channel constituting a mixing output channel shown in FIG. 8.

The digital mixer (hereafter, also referred to only as a "mixer") is an audio signal processing device which performs various kinds of processings such as mixing, equalizing, and so on for inputted audio signals in accordance with setting data and outputs the audio signals. As shown in FIG. 7, the device includes a display 11, faders 12, controls 13, an external device interface (I/F) 14, a CPU 15, a flash memory 16, a RAM 17, an audio signal input and output module 18, a digital signal processor (DSP) 19, which are connected by a system bus 20.

The display 11, which is a display means composed of a liquid crystal display (LCD) or the like, is constituted of: a display which displays a screen for referring to, modifying, saving, and so on settings of the mixer, an operating status of the device, and so on; a display which is provided for a row of control group constituted of a fader, a knob, a switch, and so on to display the name of a channel to be controlled by the row of control group; and so on.

The faders 12 and controls 13 are provided on a panel of the mixer for a user to set parameters in processing audio signals. The faders 12 have a motor to be movable to designated positions also by a direction from the CPU 15.

The external device I/F 14 is an interface for transferring information with external devices such as a personal computer and the like connected to the mixer.

The CPU 15, which is a control unit that comprehensively controls operation of the whole mixer, executes a predetermined program stored in the flash memory 16 to detect operations at the faders 12 and controls 13 and take actions in accordance with the operations, and to control the action of the DSP 19, the contents displayed on the display 11, the positions of the faders 12, and so on in accordance with later-described setting data. It should be noted that the control is conducted based on later-described current data.

The flash memory 16 is a rewritable non-volatile memory that stores a control program executed by the CPU 15, and so on. The flash memory 16 also stores, in accordance with a direction by a user, a later-described library of setting data, which is usually stored on the RAM 17 and provided for editing.

The RAM 17 is a memory that functions as a setting data memory being a first memory to store the later-described library of setting data, functions as a current memory being a second memory to store current data, and is used as a work memory for the CPU 15. As matter of course, the RAM 17 can accomplish these functions at the same time.

The current data here is setting data representing the current status of the mixer, that is, reflected in the current control. Based on the current data, the CPU 15 controls the contents displayed on the display 11 on the panel, the positions of the faders 12, and the setting statuses of the controls 13, the algorithm and parameters for audio signals mixing processing in the DSP 19, and the like.

The audio signal input and output module 18 is an interface for receiving input of audio signals to be processed in the DSP 19 and outputting processed audio signals. A plurality of A/D conversion boards each capable of analog input of four channels, D/A conversion boards each capable of analog output of four channels, and digital input and output boards each capable of digital input and output of eight channels, can be installed in combination into the audio signal input and output module 18, which actually inputs and outputs signals through the boards.

Mixing processing in the DSP 19 includes, as shown in FIG. 8, internal effectors 23, internal equalizers 24, an input patch 25, input channels 40, mixing busses 27, mixing output channels 50, matrix output channels 29, and an output patch 30. Analog inputs 21, digital inputs 22, analog outputs 31, and digital outputs 32 represent input and output channels implemented by the above-described boards to be installed into the audio signal input and output unit 18.

The internal effectors 23 are composed of plural blocks of effectors that apply selected effects to inputted signals and output the signals. The channel configuration of the internal effector 23 is changeable between monaural, stereo, and so on. The internal equalizers 24 represent 24 pieces of equalizers built in the mixer. Each of the equalizers inputs and equalizes a single signal and outputs a single signal.

The input patch 25 performs optional patch for assigning to each of the input channels 40, having 96 channels, signals inputted from the inputs of the analog inputs 21 and digital inputs 22, the input internal effectors 23, and the internal equalizers 24. A user can perform a setting of the input patch 25 while viewing a predetermined screen, so that input signals assigned by the input patch 25 are inputted into respective input channels 40.

Each of the input channels 40 includes, as shown in FIG. 9, a de-emphasis 41, a high-pass filter 42, a 4-band parametric equalizer (PEQ) 43, a noise gate 44, a compressor 45, a delay 46, and a fader 47. The de-emphasis 41 is a filter for regulating frequency characteristics, the noise gate 44 is a gate for closing (cutting off a signal line) when the signal level drops to prevent noise from remaining, the compressor 45 is a module for performing automatic gain adjustment, the delay 46 is a module for synchronizing sounding timings of a plurality of speakers when placed at positions distant from each other, and the fader 47 is a volume for level adjustment.

Although not shown, a module (ON) for controlling ON/OFF states of a signal of the input channel 40 is provided between the delay 46 and the fader 47. Further, a module (PAN) for adjusting the balance between right and left of a stereo, a module (SEND) for adjusting the output level of a signal to each of the mixing busses 27, and a module (MUTE) for turning on and off output of a signal to each of the mixing busses 27, are provided at the stage subsequent to the fader 47.

These elements may be realized by circuits or by arithmetic processing.

In the input channel 40, these elements perform predetermined processings for inputted signals and output the processed signals to a mixing bus that is set as an output destination by setting data among the mixing busses 27, having 48 busses. In this event, it is possible to output the signal from one input channel 40 to plural mixing busses 27, and also to output the signals from plural input channels 40 to one mixing bus 27.

The signal inputted to the mixing bus 27 is outputted to a corresponding mixing output channel 50. In this event, a mixing bus 27, into which signals are inputted from plural input channels 40, performs signal mixing processing.

Forty-eight mixing output channels 50 are provided to correspond to the mixing busses 27 on a one-to-one basis. Each of the channels includes, as shown in FIG. 10, a 6-band PEQ 51, a compressor 52, a delay 53, and a fader 54. The compressor 52, delay 53, and fader 54 have functions similar to those of the compressor 45, delay 46, and fader 47 in the input channel 40, respectively.

In the mixing output channel 50, these elements perform predetermined processings for inputted signals and output the processed signals to the matrix output channel 29 or output patch 30.

Twenty-four matrix output channels 29 are provided, and each can receive the output signals from optionally selected mixing output channel 50 to further mix the signals and output the signals. The matrix output channel 29 is similar in configuration to the mixing output channel, and the output of the matrix output channel is inputted to the output patch 30.

The output patch 30 performs optional patch of assigning the signals inputted from the mixing output channels 50 and matrix output channels 29 to each of the analog outputs 31 and digital outputs 32, the internal effectors 23, and the internal equalizers 24. The user can perform also the setting of the output patch 30 while viewing a predetermined screen, and the signal from one output channel can be assigned even to plural outputs. The signals assigned to the analog outputs 31 or digital outputs 32 are outputted therefrom, and the signals assigned to the internal effectors 23 or internal equalizers 24 are processed therein and then inputted again into the input patch 25.

The DSP 19 shown in FIG. 7 has the above-described configuration to perform processings such as mixing, equalizing, and so on for inputted audio signals. The DSP 19 can also mix signals selected from the input channels 40 and the output channels 50 and 29 and output the mixed signal to an output for monitoring.

It should be noted that in FIG. 8, inputs such as an input on a console side and a talk-back in, outputs such as an output on the console side and a cue out, a connection for an insert effect, and a connection for monitoring output, are omitted for simplification of the drawing.

Figure 11:
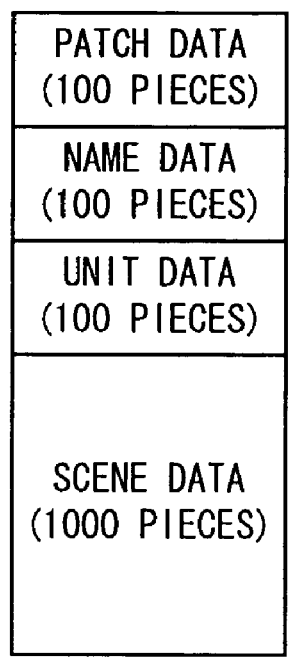
FIG. 11 is a view for explaining a configuration and a storage status of setting data in the digital mixer being the embodiment of the invention.
Figure 12:
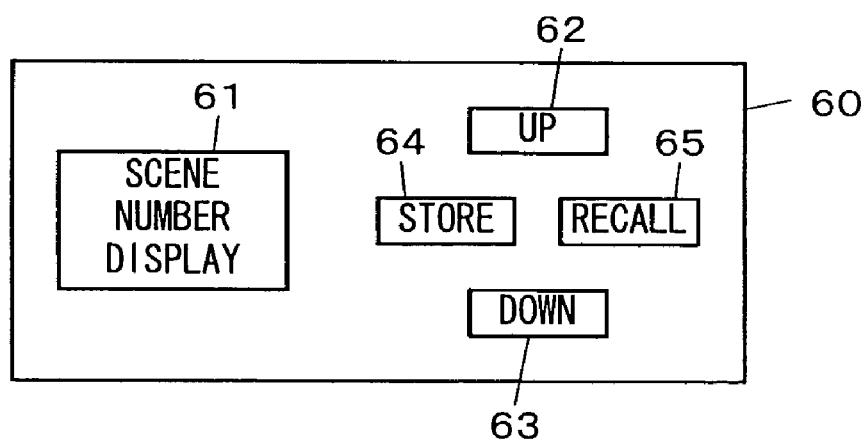
FIG. 12 is a view showing a configuration of an operation module for directing to save and load the setting data.

The setting data memory capable of storing as scenes a plurality of current data in the current memory in the digital mixer as described above will be explained next using FIG. 11 and FIG. 12. FIG. 11 is a view for explaining a configuration and a storage status of the setting data, and FIG. 12 shows a configuration of an operation module for directing a save and load of the setting data.

As is clear from the configuration of the above-described DSP 19, there are a lot of items to be set for causing the mixer to perform desired actions such as the patch statuses of the input patch 25 and output patch 30, parameters of the 4-band PEQ 43, noise gate 44, and so on in each input channel 40, channel names of the input channel 40, mixing output channel 50, and matrix output channel 29, and so on.

Hence, several setting data are stored in the setting data memory on the RAM 17 in a manner that one setting data on a series of settings as a scene (SCENE) is associated with a scene number, so that setting data can be loaded into the current memory by selecting its scene number to reproduce a required setting status at a situation where it is required. Further, an often modified portion of setting data is defined as primary setting data, and a not-often modified portion is defined as secondary setting data, with information for linking to required secondary setting data being included in the primary setting data, to reduce the storage capacity required for saving the setting data and improve the response at loading and saving the setting data.

In the mixer, patch data representing patch statuses of the input patch 25 and output patch 30, name data representing names of channels such as the input channels 40, mixing output channels 50, and matrix output channels 29, and unit data representing settings of the gain, polarity, and so on of each input/output of the input/output boards installed in the audio signal input and output module 18, are defined as the secondary setting data, and setting data other than these data and information for linking to these secondary setting data are defined as scene data being the primary setting data.

In other words, one scene is composed of the scene data, and the patch data, name data, and matrix data which are obtained by following the link information included in the scene data. The setting data memories on the flash memory 16 and RAM 17 have, as shown in FIG. 11, a storage area where 100 pieces of patch data, name data, and unit data respectively are stored as a library, and 1000 pieces of scene data are stored. A storage area in the RAM 17 where the secondary setting data such as the patch data, name data, and matrix data are stored, is called a third memory also.

The contents of the setting data memory can be stored in the flash memory 16 in response to a save direction by the user, and conversely, the contents of each library and scene data stored in the flash memory 16 can be loaded into the setting data memory on the RAM 17 in response to a load direction by the user. This action, which is an action different from later-described loading and saving each scene or copy and paste, is designed because the flash memory 16 is limited in number of rewrites, in which each scene can be edited in detail while scene data is stored in the setting data memory on the RAM 17, only required scenes can be edited, and then the final results can be stored into the flash memory 16.

The load and save of the setting data are directed by an operation module 60 shown in FIG. 12. The operation module 60 is provided on the panel of the mixer, a scene number display 61 is a part of the display 11 shown in FIG. 7, and keys 62 to 65 are parts of the controls 13.

The scene number display 61 displays in three digits the number of a scene to be a load target or a save destination, and changes numbers in an ascending order when the up-key 62 is pressed and in a descending order when the down-key 63 is pressed. When a desired number is selected by the keys and then the recall key 65 is pressed, a scene corresponding to the number is loaded from the setting data memory on the RAM 17 and stored as current data in the current memory on the same RAM 17, thereby accomplishing a load. In this processing, the CPU 15 functions as a selector and a loader. In accordance with data of the recalled scene, the mixing processing by the DSP 19 is controlled, and the display data on the display 11 and the positions of the faders 12 are modified.

When the faders 12 and controls 13 are operated after the contents are displayed on the display 11 and the positions of faders 12 are once modified, the current data is modified accompanying the operation, whereby the mixing processing by the DSP 19 is controlled based on the modified current data. Accordingly, the scene can be edited by the operation of the faders 12 and controls 13. Upon a press of the store key 64, the current data at the point of time is stored and saved, as a scene corresponding to the selected number, in the setting data memory on the RAM 17.

These processings such as loading, editing, and saving the scene are performed by control of the CPU 15.

In addition, in the mixer, it is possible to perform a "global paste", that is, select a part of the loaded or edited current data as copy data and rewrite the setting data other than the current data stored in the setting data memory on the RAM 17 with the copy data.

Figure 1:
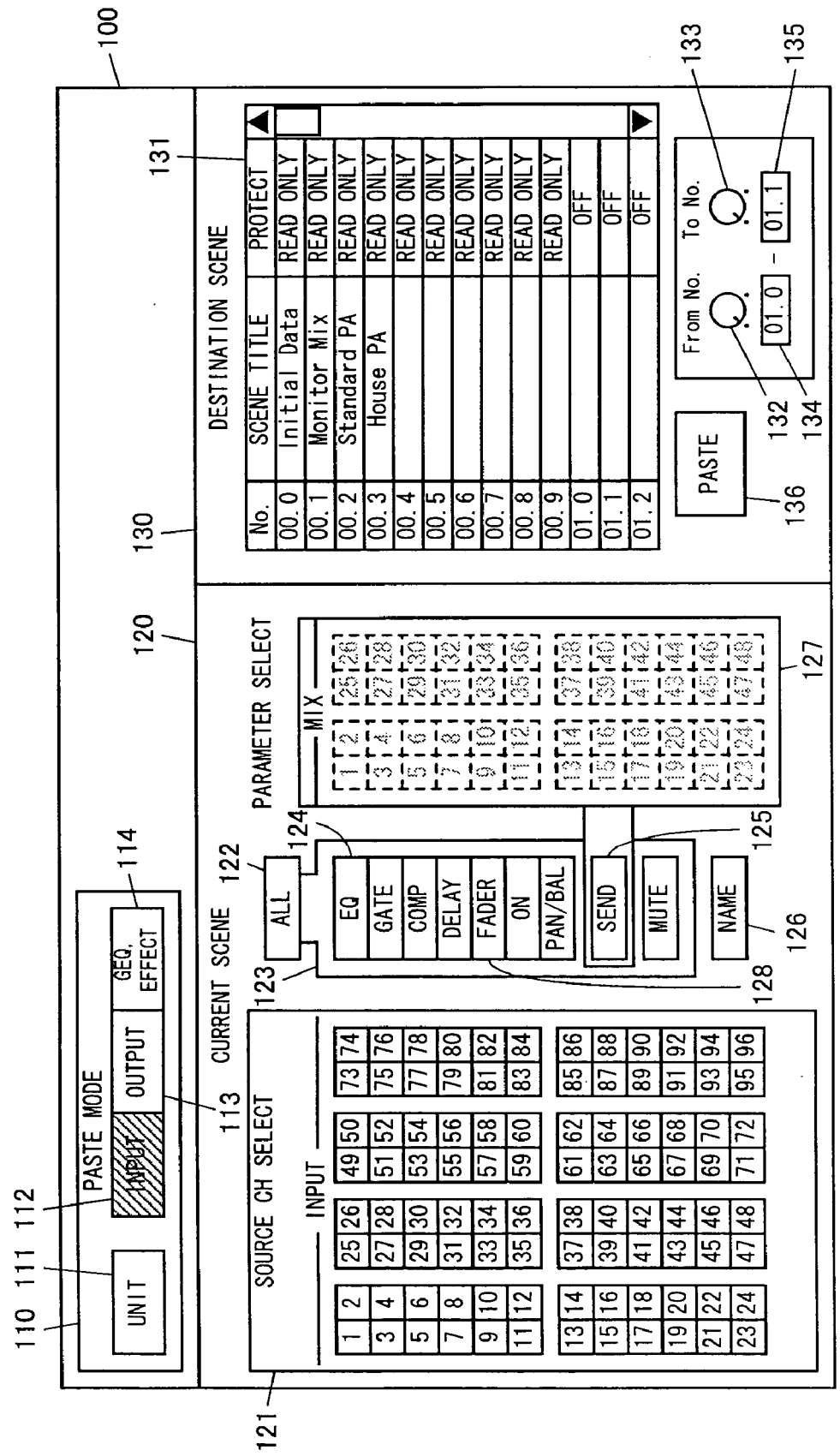
FIG. 1 is a view showing a display example of a screen for directing a global paste in a digital mixer being an embodiment of the invention.
Figure 2:
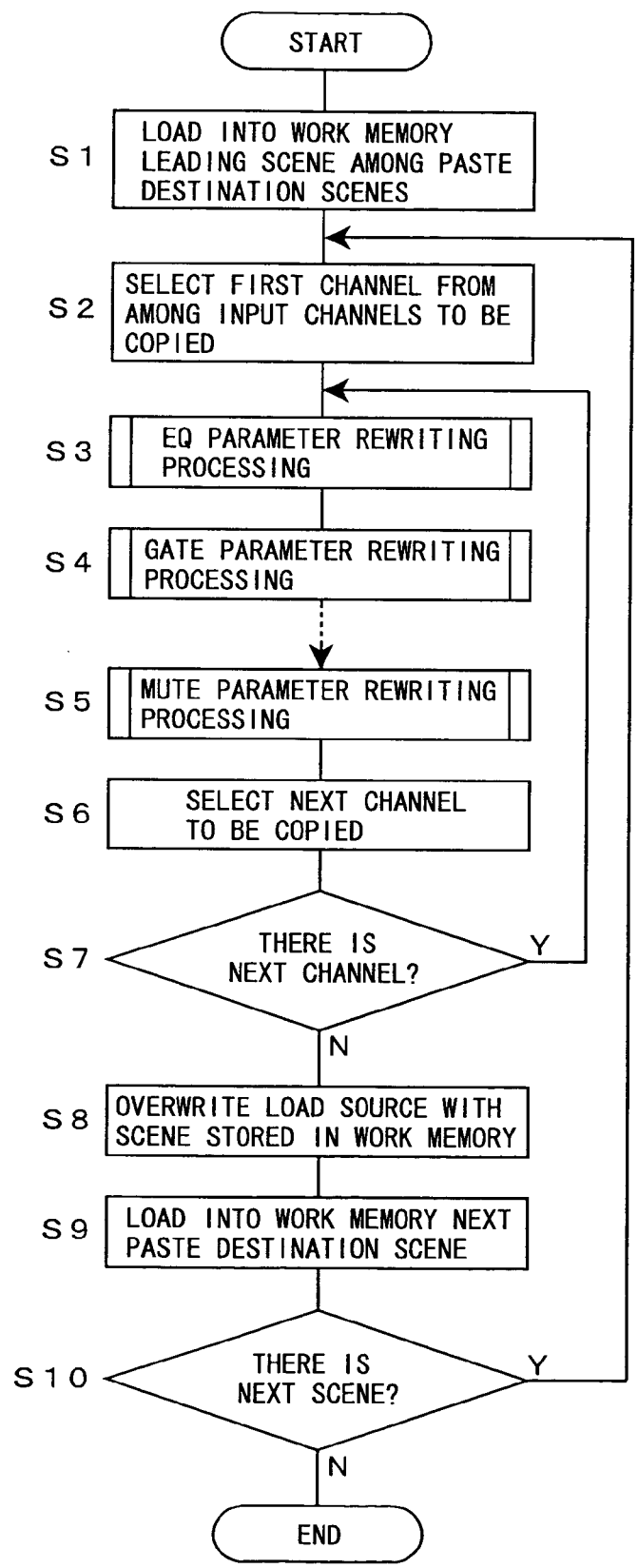
FIG. 2 is a flowchart showing processing of rewriting a setting of an input channel in the global paste.
Figure 3:
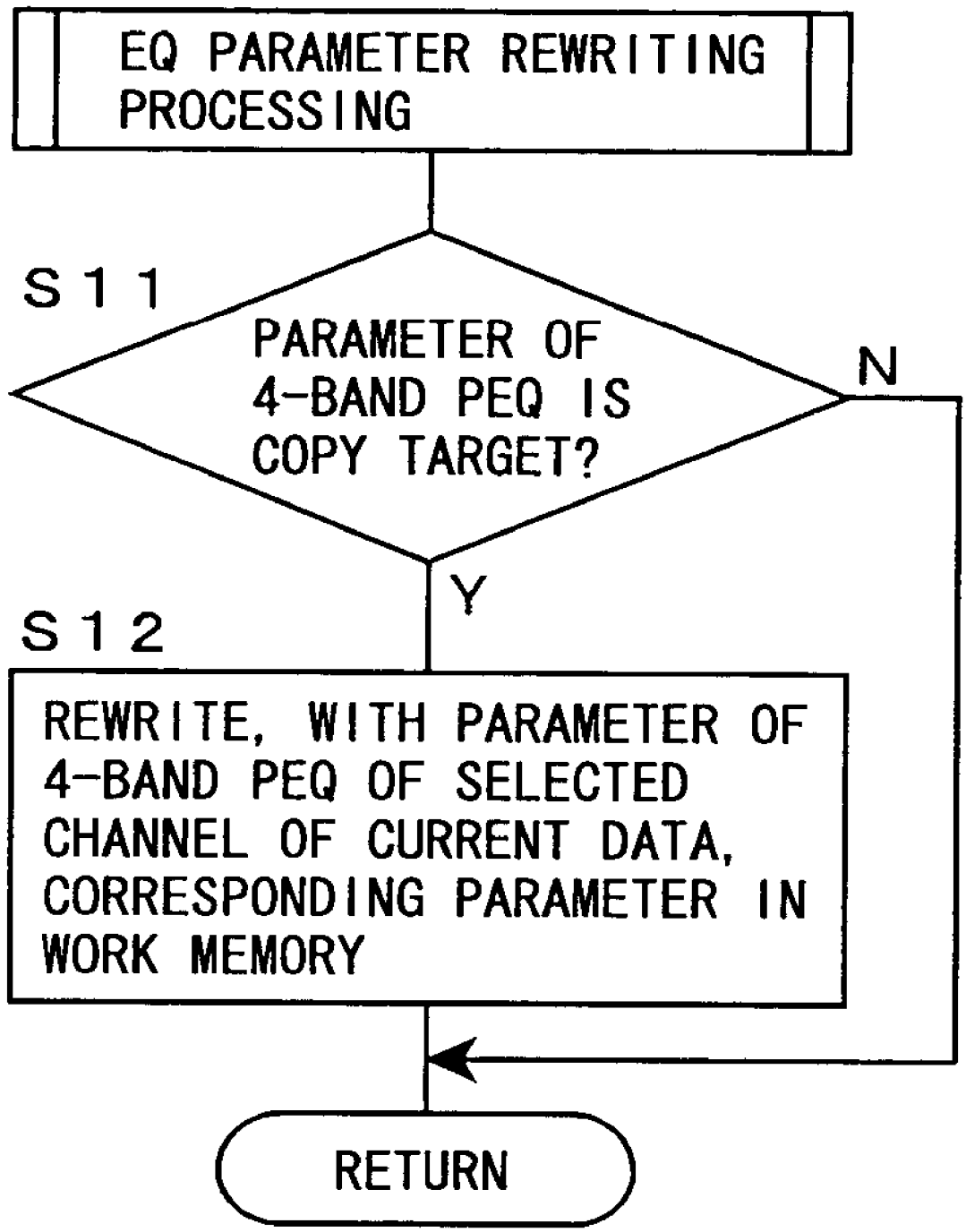
FIG. 3 is a flowchart showing EQ parameter rewriting processing shown in FIG. 2.
Figure 4:
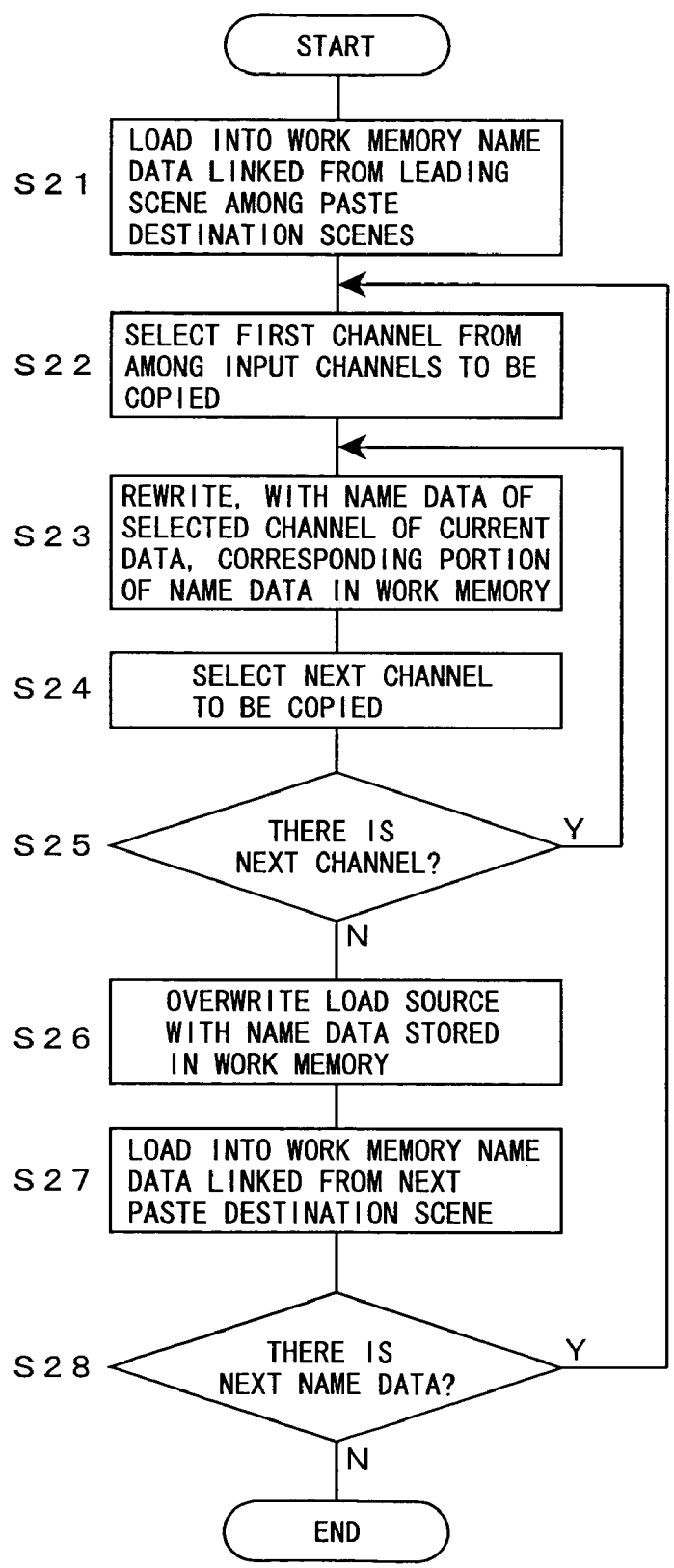
FIG. 4 is a flowchart showing processing of rewriting name data in the global paste.
Figure 5:
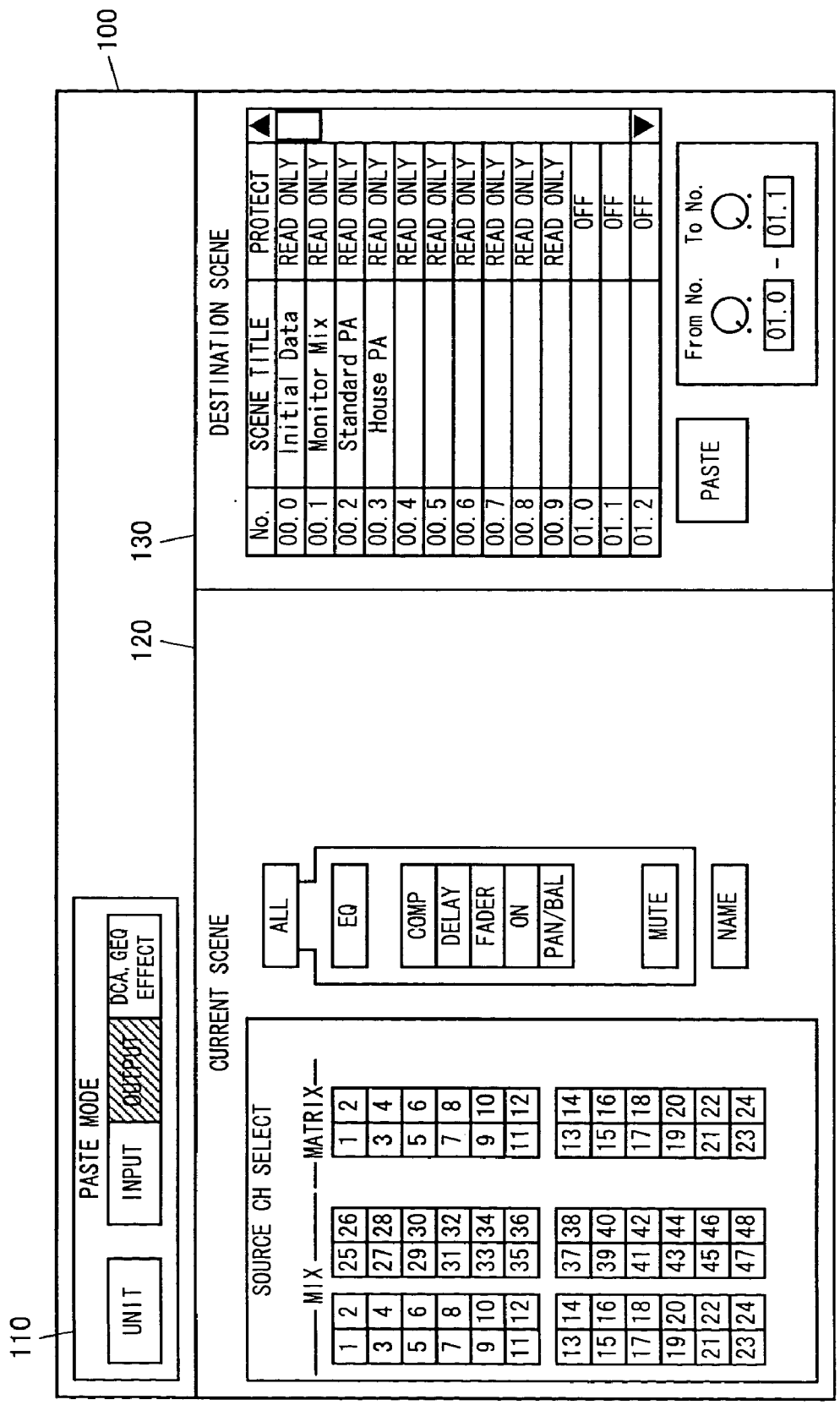
FIG. 5 and FIG. 6 are views showing display examples of screens, different from that in FIG. 1, for directing global pastes, respectively.
Figure 6:
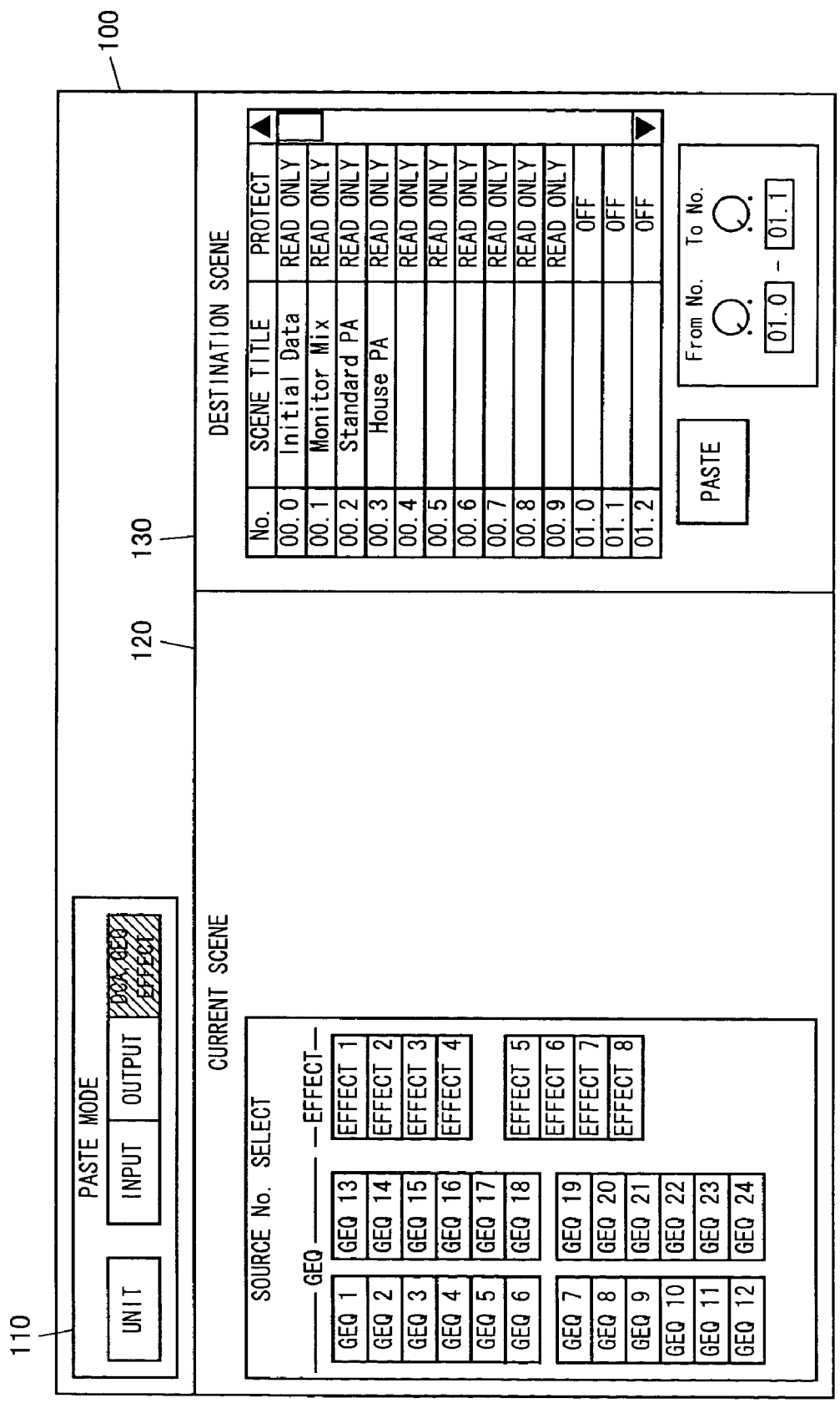

This point is a feature of the invention, and thus the rewriting processing will be explained hereafter also using FIG. 1 to FIG. 6. FIG. 1 shows a display example of a screen for directing the global paste, FIG. 2 is a flowchart showing processing of rewriting the setting of an input channel, FIG. 3 is a flowchart showing EQ parameter rewriting processing shown in FIG. 2, FIG. 4 is a flowchart showing processing of rewriting name data, and FIG. 5 and FIG. 6 show the other display examples of screens for directing global pastes, respectively.

In the mixer, when a user selects a global paste mode, the CPU 15 causes the display 11 to display a global paste direction screen 100 as shown in FIG. 1. This screen is roughly divided into sections including a paste mode selection section 110, a copy data selection section 120, and a paste destination selection section 130.

The paste mode selection section 110 is a section provided with switches for roughly selecting, as the kind of paste mode, what portion of current data is to be copied. The paste mode selection section 110 includes a unit switch 111 for selecting unit data, an input channel switch 112 for selecting the setting of the input channel 40, an output channel switch 113 for selecting the settings of the mixing output cannel 50 and matrix output channel 29, and an effector switch 114 for selecting the settings of the internal effector 23 and internal equalizer 24.

Only one of these switches can be selected and turned on. In accordance with the turned-on switch, the CPU 15 sets a paste mode and change the display contents in the copy data selection section 120 to allow data to be copied to be selected in more detail in accordance with the paste mode. FIG. 1 shows a display example of the state in which the input channel switch 112 with hatchings is turned on.

The copy data selection section 120 is a section provided with switches for selecting in more detail what portion of current data is to be copied in accordance with the paste mode. In execution of the global paste, the CPU 15 selects a portion to be copied among the current data as copy data in accordance with the setting at the copy data selection section 120, thus functioning as a copy data selector.

The portion to be copied here refers to, for example, parameters of some channels when audio signals of a plurality of channels are processed, some parameters of processings when a plurality of processings are sequentially performed for one audio signal, parameters of some effect applying processings when a plurality of effect applying processings are executed in parallel for audio signals, parameters of some parts when audio signals in a plurality of parts are processed, and so on.

FIG. 1 is of a paste mode of copying the setting of the input channel 40, and thus shows, in the copy data selection section 120, an input channel selection section 121, an all setting selection switch 122, an individual setting selection switch group 123, a name data selection switch 126, and an output destination selection switch group 127.

The input channel selection section 121 is a portion which displays a group of switches for selecting the number of input channel whose setting is to be copied, in which a first to a 96th switch are provided in correspondence with the input channels having 96 channels. One of the switches can be optionally selected and turned on to set to copy the setting of the input channel corresponding to the number of the switch. A plurality of channels can also be selected as a matter of course. When a paste is executed, since the setting of an input channel having a same number as that of a copy source is to be rewritten, a channel number of a paste destination is automatically selected here in addition to that of the copy source.

The individual setting selection switch group 123 is a group of switches for selecting which setting is to be copied among the setting of the input channel 40 selected at the input channel selection section 121. For example, turning on an equalizer (EQ) switch 124 means selection to copy the setting of the 4-band PEQ 43 of the selected input channel 40. Further, a plurality of settings can be selected concurrently as long as they are in the individual setting selection switch group 123.

An output destination (SEND) switch 125 is a switch for selecting to copy the setting of the output level from the input channel 40 to each mixing bus 27. This switch, when turned on, brings the output destination selection switch group 127 in a half-luminance display (shown by broken lines) in FIG. 1 into an active, normal display state. In the output destination selection switch group 127, a first to a 48th switch corresponding to the 48 mixing busses 27 are provided, so that the switches are used to select the mixing bus to which the output level is set as a copy target.

It should be noted that copying of the setting of the de-emphasis 41 and high-pass filter 42 shown in FIG. 9 will be selected together with copying of the setting of the fader 47 by a fader (FADER) switch 128.

The all setting selection switch 122 is a switch for turning on all of the switches included in the individual setting selection switch group 123 by one operation. When the all setting selection switch 122 is turned on, all of the switches included in the individual setting selection switch group 123 (also including the switches included in the output destination selection switch group 127) are brought into an ON state, and operation of the switches in the individual setting selection switch group 123 is prevented in this state.

The name data selection switch 126 is a switch for selecting to copy the setting of a name for the input channel 40 selected at the input channel selection section 121. The setting selected at the above-described individual setting selection switch group 123 is included in scene data, while the setting of name is included in name data linked from the scene data. Hence, the name data selection switch 126 and the switches in the individual setting selection switch group 123 are configured not to be turned on concurrently.

The paste destination selection section 130 is a section provided with switches each for selecting a paste destination scene. In execution of the global paste, the CPU 15 selects the setting data to be a paste destination in accordance with the setting at the paste destination selection section 130, thus functioning as a paste destination selector. The paste destination selection section 130 displays a scene list display section 131, a paste destination leading scene selection dial 132, a paste destination ending scene selection dial 133, a paste destination leading scene display section 134, a paste destination ending scene display section 135, and a paste execution key 136.

The scene list display section 131, which is a portion for displaying a list of scenes stored in the setting data memory on the RAM 17, displays numbers, names, and protect states of scenes. The display can be scrolled using a scroll bar at the right end. It should be noted that the scenes are stored with given numbers from 00.0 to 99.9 in which empty data should be stored in portions of unused numbers. The "protect state" (in FIG. 1) represents capability/incapability of modification, and a scene with display "READ ONLY" is inhibited from being overwritten and cannot be selected as a paste destination.

A paste destination scene is selected by the paste destination leading scene selection dial 132 and paste destination ending scene selection dial 33. In other words, the dials can be rotated to set leading and ending numbers of a scene to be paste destinations and select as paste destinations scenes of numbers between them. The setting values of the dials are displayed at the paste destination leading scene display section 134 and paste destination ending scene display section 135. Alternatively, the selection may be carried out by directly inputting numbers into the display sections. Further, the selection may be carried out by clicking numbers or names of scenes displayed at the scene list display section 131 or the like. As a matter of course, it is also adoptable to allow a plurality of discontinuous numbers to be selected.

The paste execution key 136 is a key for directing execution of the global paste. When the key is pressed, the CPU 15 performs processing of loading scenes selected as paste destinations into the work memory in sequence in accordance with the setting at the paste destination selection section 130, rewriting the corresponding portion of the current data with copy data selected in accordance with the setting at the copy data selection section 120, and overwriting the load source scenes.

This processing is implemented by processing shown in the flowchart of FIG. 2 or FIG. 4 in the paste mode with the input channel switch 112 turned on as shown in FIG. 1. More specifically, the processing is implemented by the processing of the flowchart in FIG. 2 when the all setting selection switch 122 or the switch in the individual setting selection switch group 123 is turned on to take the data in the scene data as copy data, or by the processing of the flowchart in FIG. 4 when the name data selection switch 126 is turned on to take the name data as copy data. When the paste execution key 136 is pressed, the CPU 15 starts appropriate processing of the flowchart in accordance with the setting on the global paste direction screen 100.

The processing of the flowchart in FIG. 2 will be explained first.

In the processing, the scene data indicative of a scene will be rewritten. Hence, in step S1, the scene data indicative of a leading scene among scenes selected as paste destinations in accordance with the setting at the paste destination selection section 130, is loaded from the setting data memory on the RAM 17 into the work memory which is set in a storage area different from the current memory on the RAM 17. The CPU 15 functions here as a loader.

Subsequently, in step S2, a portion to be copied among the current data is selected as copy data in accordance with the setting at the copy data selection section 120, and the first channel from among the input channels included in the copy data is selected. Incidentally, the processing in this step does not require to store the copy data separately from the current data, but the CPU 15 is sufficiently able to recognize what portion of the current data is the copy data.

In subsequent step S3, the EQ parameter rewriting processing shown in the flowchart of FIG. 3 is performed.

More specifically, in step S11, it is first determined whether the parameter of the 4-band PEQ 43 is the copy data. In other words, it is determined whether the EQ switch 124 is ON. If it is ON, the flow proceeds to step S12, in which the parameter of the 4-band PEQ 43 of the selected input channel of the current data is used to rewrite the parameter of the 4-band PEQ 43 of the same channel in the work memory, that is, the parameter of the 4-band PEQ 43 is pasted into the paste destination, and the flow returns to the main processing. If the EQ switch 124 is not ON in step S11, the parameter of the 4-band PEQ 43 of the selected input channel of the current data is not the copy data, and thus rewriting is not performed. The flow just returns to the main processing.

The explanation is returned to FIG. 2. After completion of the EQ parameter rewriting processing in step S3, rewriting processing, through the illustration thereof is partially omitted, is performed corresponding to the individual setting selection switches GATE, COMP, DELAY, FADER, ON, PAN/BAL, SEND, and MUTE, through a portion with a broken line from step S4 to step S5, so that when the respective switches are ON, parameters of the noise gate 44, compressor 45, delay 46, fader 47, de-emphasis 41, high-pass filter 42, the ON/OFF control of channel, the not-shown pan/balance, the sending level to each mixing bus, and the efficient/inefficient state of the mute of the selected input channel in the current data are used to rewrite the corresponding parameters of the same channel in the work memory. These processings are generally similar to the EQ parameter rewriting processing shown in FIG. 3, and thus the description thereof is omitted. In the SEND parameter rewriting processing of rewriting the parameter of the sending level to each mixing bus, only parameters, to be selected as copy targets, of the mixing busses whose switches in the output destination selection switch group 127 are turned on will be rewritten.

The processing until step S5 completes the whole rewriting processing for one input channel, and thus in step S6, a next input channel is selected from the copy data. Then, in step S7, it is determined whether there is a next channel, and if there is one, the flow returns to step S3 to repeat the processing. In the processing from step S2 to step S7, the CPU 15 functions as a paste executor. In the broad sense, it can be said that the CPU 15 functions as a paste executor in the whole processing of the flowchart in FIG. 2.

If there is no next channel in step S7, it is determined that all the rewriting processing necessary for the scene data stored in the work memory is finished, and the flow proceeds to step S8, in which the load source of the scene data in the setting data memory on the RAM 17 is overwritten with the rewritten scene data stored in the work memory. The CPU 15 functions here as a modified data writer.

In the subsequent step S9, a next scene is selected from the paste destination scenes, and scene data indicative of the scene is loaded from the setting data memory on the RAM 17 into the work memory. Also in step S9, the CPU 15 functions as a loader. Then, in step S10, it is determined whether there is a next scene, and if there is one, the flow returns to step S2 to repeat the processing. If there is no next scene, the rewriting for all of the paste destinations is completed, and thus the processing is ended.

The processing of the flowchart in FIG. 4 will be explained next.

Here, the name data representing a scene will be rewritten. Hence, in step S21, the name data linked from a leading scene among scenes selected as paste destinations in accordance with the setting at the paste destination selection section 130, is loaded from the setting data memory on the RAM 17 into the work memory on the same RAM 17. The CPU 15 functions here as a loader.

Subsequently, in step S22, a portion to be copied among the name data in the current memory (that is, the name data of the channel selected at the input channel selection section 121), is selected as copy data in accordance with the setting at the copy data selection section 120, and the first channel from among the input channels included in the copy data is selected. It should be noted that there is nonnecessity of storing the copy data separately from the current data as in step S2 in FIG. 2.

In the subsequent step S23, a corresponding portion of the name data stored in the work memory is rewritten with the name data on the selected channel of the current data. In other words, the name data on the selected channel is pasted into the paste destination.

Then, in step S24, a next input channel is selected from the copy data, and in step S25, it is determined whether there is a next channel. If there is one, the flow returns to step S23 to repeat the processing. In the processing from step S22 to step S25, the CPU 15 functions as a paste executor. In the broad sense, it can be said that the CPU 15 also functions as a paste executor in the whole processing of the flowchart in FIG. 4.

In step S25, if there is no next channel, it is determined that all the rewriting processing necessary for the name data stored in the work memory is finished, and the flow proceeds to step S26, in which the load source of the name data in the setting data memory on the RAM 17 is overwritten with the rewritten name data stored in the work memory. The CPU 15 functions here as a modified data writer.

It should be noted that, instead of overwriting the setting data memory on the RAM 17 with the rewritten name data, an unused storage area of the name data storage area in the setting data memory is allocated so that the rewritten name data may be newly written into the allocated area. In this case, the link destination of the name data in the scene selected as the paste destination is updated to the newly written name data.

This enables prevention of influence on other scene data having link to name data to be rewritten by the paste. For example, when there is, in scenes not selected as paste destinations, a scene linked to same name data as the scene selected as a paste destination, influence on the contents of the scene can be prevented.

In the subsequent step S27, a next scene is selected from the paste destination scenes, and the name data linked from the scene is loaded from the setting data memory on the RAM 17 into the work memory. Also in step S27, the CPU 15 functions as a loader. Then, in step S28, it is determined whether there is next name data, and if there is next name data, the flow returns to step S22 to repeat the processing. If there is no next name data, the rewriting processing for all of the paste destinations is completed, and thus the processing is ended.

There is a conceivable case here that link is established from a plurality of scenes selected as paste destinations to same name data. Therefore, when the name data which has been once rewritten becomes again a load target, instead of loading the data, name data linked from a next scene is preferably loaded.

In the foregoing, for example, the action in the paste mode with the input channel switch 112 turned on has been explained. In addition to this, a global paste direction screen as shown in FIG. 5 in a paste mode with the output channel switch 113 turned on, or as shown in FIG. 6 in a paste mode with the effector switch 114 turned on, is displayed to enable selection of copy data corresponding to each paste mode.

In the example shown in FIG. 5, the number of mixing output channel 50 or matrix output channel 29 whose setting is to be copied, and which parameter of the channel is to be copied, are possible to be selected. In the example shown in FIG. 6, the internal effector 23 or internal equalizer 24 whose setting is to be copied is possible to be selected.

When the paste execution key 136 is pressed in the paste modes, the CPU 15 executes the global paste, that is, processing of copying the selected copy data in the current memory to the scene selected as the paste destination, through appropriate processing similar to that in FIG. 2 or FIG. 4 in accordance with data selectable as copy data in each of the modes.

By executing such processing, the contents edited on a current scene can be easily reflected also in other scenes to improve the operability of work of editing setting data. In this event, even when modification needs to be reflected in many scenes, such modification can be directed only by one operation. Thus, the effect of improved operability is particularly exhibited in this case.

Further, editing can be performed without loading the paste destination scene as current data, which eliminates necessity of waiting for finish of modification of the positions of controls or the like accompanying the load, resulting in improved response of editing operation.

A plurality of paste modes are provided in the global paste in this mixer for reasons of configuration of programs executed by the CPU 15. Accordingly, the kind of the paste mode is not limited to the above-described ones. Alternatively, it is adoptable to allow data to be copied to be appropriately selected while the screen is being changed, and all the selected data to be rewritten only by pressing once the paste execution key 136. As a matter of course, it is adoptable to allow scene data and each secondary setting data linked therefrom to be rewritten only by one operation.

When an empty scene is selected as a paste destination scene, predetermined initial data, in place of the empty data, is preferably stored in the work memory in loading scene data corresponding to the selected scene. It is also preferable that the predetermined initial data is similarly stored in the work memory also in loading secondary setting data on the empty scene. In such case, the scene data is preferably modified into predetermined initial data linking to the secondary setting data.

This configuration allows easy creation/editing of a new scene starting with versatile initial data to further improve the operability of editing work.

The example, in which the portion corresponding to the copy data among the data stored in the work memory is rewritten with the copy data, is explained here, and another portion may be rewritten. More specifically, it is also preferable that, for example, where the parameter on a first input channel in the current data is set as the copy data, a parameter on an optional input channel (for example, a second channel) of the scene data stored in the work memory can be rewritten with the data. This configuration enables enhancement of the degree of freedom of the global paste and further improvement of the operability of editing work.

In the above-described embodiments, the examples in which the invention is applied to a digital mixer have been described. It is needless to say that the invention is also applicable to various audio signal processing devices comprising a mixer, an effector, a recorder, a synthesizer, and combination thereof.

The invention is also applicable to electronic musical instruments. More specifically, it is also possible to make an electronic musical instrument, which stores a plurality of setting data on tone, playing mode, or the like, capable of selecting an optional portion of current data and rewriting other setting data with the data. Further, it is possible that when setting data on a plurality of parts are stored, setting data on other optionally selected parts can be rewritten with the setting data edited in a current memory.

For example, an electronic organ can be made capable of a global paste of data called a registration, which includes data of part settings, and in this case, settings of automatic playing, effect, rhythm, and so on can be possible to be selected as a copy target.

As has been described, according to the audio signal processing device of the invention, the contents edited on a current scene can be easily reflected also in other scenes to improve the operability of work of editing setting data. In this event, even when modification needs to be reflected in many scenes, such modification can be collectively directed only by one operation. Thus, the effect of improved operability is particularly exhibited in this case.

Further, editing can be performed without loading the paste destination scene as current data, which eliminates necessity of waiting for finish of the modification of the positions of controls or the like accompanying loading, resulting in improved response of editing operation.

What is claimed is:

1. An audio signal processing device which processes audio signals and outputs the audio signals, comprising:
    a first memory for storing a plurality of setting data each representing a setting status of said device;
    a second memory for storing current data being setting data representing a current setting status of said device;
    a controller for controlling the processing for the audio signals based on the current data;
    a copy data selector for selecting a portion to be copied among the current data as copy data;
    a paste destination selector for selecting setting data to be a paste destination of the copy data from the setting data stored in said first memory; and
    a paste executor for rewriting with the copy data a portion corresponding to the copy data among the setting data selected by said paste destination selector.

2. An audio signal processing device according to claim 1, wherein
    the setting status of said device is a setting status of a parameter on the processing for the audio signals.

3. An audio signal processing device which processes audio signals and outputs the audio signals, comprising:
    a first memory for storing a plurality of setting data each representing a setting status of said device;
    a second memory for storing current data being setting data representing a current setting status of said device;
    a controller for controlling the processing for the audio signals based on the current data;
    a work memory for temporarily storing the setting data;

a copy data selector for selecting a portion to be copied among the current data as copy data;

a paste destination selector for selecting setting data to be a paste destination of the copy data from the setting data stored in said first memory;

a loader for loading the setting data selected by said paste destination selector into said work memory;

a paste executor for rewriting with the copy data a portion corresponding to the copy data among the setting data loaded by said loader; and a modified data writer for writing the setting data rewritten by said paste executor over setting data of a load source by said loader.

4. An audio signal processing device according to claim 3, wherein when the setting data to be loaded is empty data, said loader causes said work memory to store predetermined initial data in place of the empty data.

5. An audio signal processing device according to claim 3, wherein the setting status of said device is a setting status of a parameter on the processing for the audio signals.

6. An audio signal processing device which processes audio signals and outputs the audio signals, comprising:

a first memory for storing a plurality of primary setting data each representing a setting status of said device;

a second memory for storing current data being setting data representing a current setting status of said device, including the primary setting data and secondary setting data linked from the primary setting data;

a third memory for storing the secondary setting data linked from each of the primary setting data;

a selector for selecting primary setting data to be loaded from the primary setting data stored in said first memory;

a loader for loading the primary setting data selected by said selector and secondary setting data linked from the primary setting data, as the current data into said second memory;

a controller for controlling the processing for the audio signals based on the current data;

a paste destination selector for selecting primary setting data to be a paste destination of the secondary setting data constituting the current data, from the primary setting data stored in said first memory; and a paste executor for rewriting with the secondary setting data constituting the current data the secondary setting data linked from the primary setting data selected by said paste destination selector.

7. An audio signal processing device according to claim 6, wherein the setting status of said device is a setting status of a parameter on the processing for the audio signals.

8. A machine-readable medium containing program instructions executable by a computer and causing said computer to execute:

a process of controlling processing for audio signals based on a current data being setting data representing current setting status of said computer;

a process of selecting a portion to be copied among the current data as copy data;

a process of selecting setting data to be a paste destination of the copy data from a plurality of setting data each representing a setting status of said computer and stored in a memory; and a process of rewriting with the copy data a portion corresponding to the copy data among the setting data selected to be said paste destination.

9. A machine-readable medium containing program instructions executable by a computer and causing said computer to execute:

a process of controlling processing for audio signals based on current data being setting data representing a current setting status of said computer;

a process of selecting a portion to be copied among the current data as copy data;

a process of selecting setting data to be a paste destination of the copy data from a plurality of setting data each representing a setting status of said computer and stored in a memory; and a process of temporarily loading the setting data selected to be said paste destination into a work memory;

a process of rewriting with the copy data a portion corresponding to the copy data among the loaded setting data; and a process of writing the rewritten setting data over a load source of the setting data.

10. A machine-readable medium containing program instructions executable by a computer and causing said computer to execute:

a process of controlling processing for audio signals based on current data being setting data representing a current setting status of said computer, including primary setting data representing a setting status of said computer and secondary setting data linked from the primary setting data;

a process of selecting primary setting data to be a paste destination of the secondary setting data constituting the current data, from a plurality of the primary setting data stored in a memory; and a process of rewriting with the secondary setting data constituting the current data the secondary setting data linked from the primary setting data selected to be said paste destination.

* * * * *